G. W. CARR.
Corn-Huskers.
No. 143,667. Patented Oct. 14, 1873.
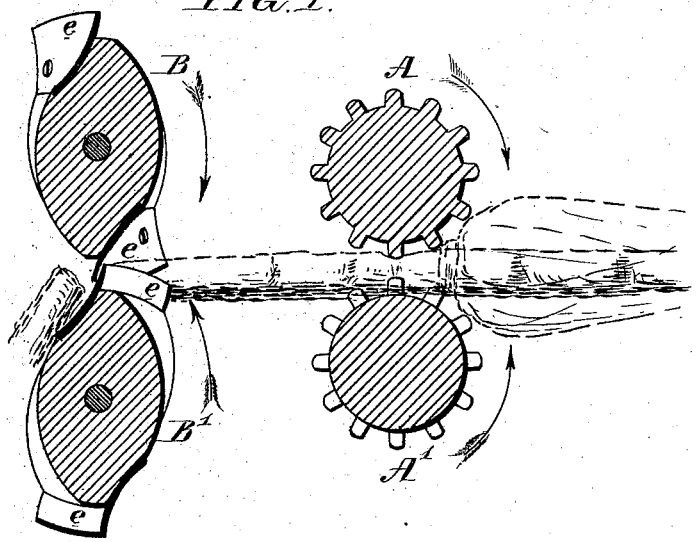
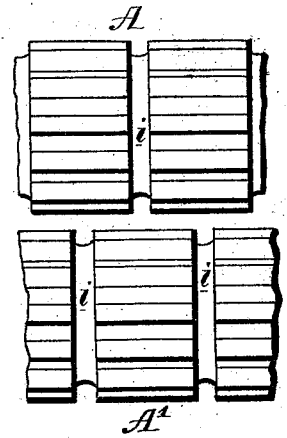
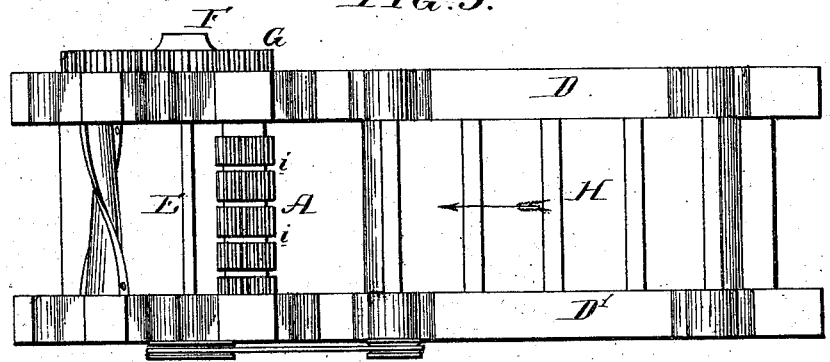
Witnesses,
Thomas McIlvain
John K. Rupertus
Geo. W. Carr
By his Attys.
Howson and Son

UNITED STATES PATENT OFFICE.

GEORGE W. CARR, OF PHILADELPHIA, PENNSYLVANIA.

IMPROVEMENT IN CORN-HUSKERS.

Specification forming part of Letters Patent No. 143,667, dated October 14, 1873; application filed July 24, 1873.

*To all whom it may concern:*

Be it known that I, GEORGE W. CARR, of the city and county of Philadelphia, State of Pennsylvania, have invented an Improved Corn-Husking and Stalk-Cutting Machine, of which the following is a specification:

The object of my invention is to rapidly and effectually remove the husks from corn by means of rollers A and A', shown in the vertical section, Figure 1, of the accompanying drawing, the said rollers having grooves and teeth arranged in the peculiar manner illustrated in the side view, Fig. 2, the entire corn-stalk being passed between the rollers, which dislodge the contents of the husk, the corn falling down in front of the rollers while the crushed stalk and husk are directed to rotary knives B B', which sever the stalks into lengths suitable for fodder. The rollers and cutters are mounted on frames of different styles. In the present instance they are arranged to turn in suitable bearings on two opposite frames, D D', of wood, which are connected together by suitable cross-pieces, as shown in the general plan view, Fig. 3. The driving-shaft E has a cog-wheel, F, gearing into a pinion, G, on the lower roller A', which is so geared to the upper roller that both shall revolve simultaneously, and the same wheel F gears into a pinion on the shaft of the lower rotary knife, which is geared to the shaft of the upper knife.

Whatever system of driving-gear is employed the rollers should always revolve simultaneously in the contrary directions indicated by the arrows. The teeth of each roller are arranged in sets separated from each other by transverse grooves $i$, as shown in Fig. 2, each groove of one roller being directly above the center of a set of teeth of the lower roller, as shown in Fig. 2. After repeated and long-continued experiments I have ascertained that this system of teeth is the best for performing the duty of husking the corn.

The corn-stalks with ears attached are placed butt end foremost on an endless apron, H, driven in the direction of the arrow from the driving-shaft E, and each stalk is directed by the apron to the rollers, which crush it and drag it forward. When an ear reaches the rollers it is necessarily forcibly compressed at the butt, while the corners of the teeth penetrate and retain the husk, the consequence of which action is the dislodgment of the cob from the husk, the former falling down in front of the rollers, and the husk passing with the stalk between the rollers to the knives.

The rollers A A' can be used alone, if desired, for husking corn which has been broken from the stalks, the small portion of the stalk which remains attached to the butt of the ear being sufficient to give the said rollers the required hold.

I do not desire to claim, broadly, husking-rollers having transverse grooves and projecting-teeth; but

I claim as my invention—

The within-described corn-husking rollers having recesses and intermediate teeth extending from recess to recess, and so arranged that the recesses of one roll shall be opposite to the teeth of the other roll, all as set forth.

In testimony whereof I have signed my name to this specification in the presence of two subscribing witnesses.

GEO. W. CARR.

Witnesses:
 WM. A. STEEL,
 HUBERT HOWSON.